(12) United States Patent
Moran et al.

(10) Patent No.: US 9,690,353 B2
(45) Date of Patent: Jun. 27, 2017

(54) SYSTEM AND METHOD FOR INITIATING A REDUCED POWER MODE FOR ONE OR MORE FUNCTIONAL BLOCKS OF A PROCESSOR BASED ON VARIOUS TYPES OF MODE REQUEST

(71) Applicant: Intel Corporation, Santa Clara, CA (US)

(72) Inventors: Douglas Moran, Folsom, CA (US); Achmed Rumi Zahir, Menlo Park, CA (US); William Knolla, Folsom, CA (US); Hartej Singh, Folsom, CA (US); Vasudev Vasu Bibikar, Austin, TX (US); Sanjeev Jahagirdar, Folsom, CA (US); Michael Klinglesmith, Portland, OR (US); Irwin Vaz, Milpitas, CA (US); Varghese George, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 56 days.

(21) Appl. No.: 13/799,524

(22) Filed: Mar. 13, 2013

(65) Prior Publication Data
US 2014/0281616 A1 Sep. 18, 2014

(51) Int. Cl.
*G06F 1/00* (2006.01)
*G06F 1/32* (2006.01)

(52) U.S. Cl.
CPC .......... *G06F 1/3234* (2013.01); *G06F 1/3243* (2013.01); *G06F 1/3287* (2013.01);
(Continued)

(58) Field of Classification Search
CPC .... G06F 1/3203; G06F 1/3287; G06F 1/3246; G06F 1/324; G06F 21/81; G06F 1/3234
See application file for complete search history.

(56) References Cited

U.S. PATENT DOCUMENTS 6,678,831 B1 * 1/2004 Mustafa ............... G06F 1/3203
713/300
6,785,826 B1 8/2004 Durham et al.
(Continued)

FOREIGN PATENT DOCUMENTS

CN 100381978 C 4/2008
GB 2493257 A 1/2013
(Continued)

OTHER PUBLICATIONS

KR office action issued in corresponding KR10201429880 dated Apr. 1, 2015 [w/English translation], (10 pages).
(Continued)

*Primary Examiner* — Thomas Lee
*Assistant Examiner* — Zhipeng Wang
(74) *Attorney, Agent, or Firm* — Trop, Pruner & Hu, P.C.

(57) ABSTRACT

In an embodiment, a processor includes at least one functional block and a central power controller. The at least one functional block may include at least one block component and block power logic. The block power logic may be to: receive a first request to initiate a first reduced power mode in the at least one functional block, and in response to the first request, send a notification signal to a central power controller. The central power controller may be to, in response to the notification signal: store a first state of the at least one functional block, and initiate the first reduced power mode in the at least one functional block. Other embodiments are described and claimed.

23 Claims, 8 Drawing Sheets

(52) U.S. Cl.
CPC ....... *Y02B 60/1239* (2013.01); *Y02B 60/1282* (2013.01); *Y02B 60/32* (2013.01)

(56) References Cited

U.S. PATENT DOCUMENTS

| | | | |
|---|---|---|---|
| 6,802,014 B1* | 10/2004 | Suurballe | G06F 1/3203 307/31 |
| 8,166,328 B2 | 4/2012 | Yang et al. | |
| 8,321,693 B2 | 11/2012 | Melpignano et al. | |
| 8,707,062 B2* | 4/2014 | Jahagirdar | G06F 1/3203 711/147 |
| 2004/0088630 A1 | 5/2004 | Arima et al. | |
| 2009/0249098 A1* | 10/2009 | Han | G06F 1/3203 713/322 |
| 2010/0302028 A1* | 12/2010 | Desai | H04W 52/0258 340/539.3 |
| 2010/0313050 A1* | 12/2010 | Harrat | G06F 1/3203 713/323 |
| 2011/0035611 A1 | 2/2011 | Brey et al. | |
| 2012/0102344 A1* | 4/2012 | Kocev | G06F 1/3237 713/322 |
| 2013/0031388 A1* | 1/2013 | Sakarda | G06F 1/3287 713/320 |
| 2013/0124890 A1* | 5/2013 | Priel | G06F 1/3234 713/320 |
| 2014/0181557 A1* | 6/2014 | Branover | G06F 1/3234 713/323 |

FOREIGN PATENT DOCUMENTS

| | | |
|---|---|---|
| JP | Hei 10-091298 | 4/1998 |
| JP | 2004126932 A | 4/2004 |
| JP | 2011164089 A | 8/2011 |
| KR | 10-2010-0072614 | 7/2010 |
| WO | 03036449 A1 | 5/2003 |
| WO | 2012014014 A1 | 2/2012 |

OTHER PUBLICATIONS

JP office action issued in corresponding JP2014047100 dated Feb. 2, 2015 [w/English translation], (3 pages).
GB office action issued in corresponding GB1404478.8 dated Jul. 29, 2014, (6 pages).
JP office action issued in corresponding JP2014047100 dated Jul. 7, 2015 [w/English translation], (4 pages).
GB office action issued in corresponding GB1404478.8 dated Jul. 22, 2015, (2 pages).
DE office action issued in corresponding DE102014003704.5 dated Apr. 25, 2016 (with translation), (7 pages).
DE office action issued in corresponding DE102014003704.5 dated Nov. 17, 2015 [w/English translation], (13 pages).
CN office action issued in corresponding CN201410231203.1 dated Mar. 3, 12016, (10 pages).
CN office action issued in corresponding CN application 201410231203.1 dated Nov. 23, 2016 (9 pages).

* cited by examiner

SYSTEM AND METHOD FOR INITIATING A REDUCED POWER MODE FOR ONE OR MORE FUNCTIONAL BLOCKS OF A PROCESSOR BASED ON VARIOUS TYPES OF MODE REQUEST

TECHNICAL FIELD

Embodiments relate generally to power management of electronic devices.

BACKGROUND

Conventionally, an electronic device may include one or more reduced power mode, meaning an operating mode in which at least one component of the device is placed in a reduced power state. The use of a reduced power mode may decrease the amount of electrical power consumed in comparison to an "awake" or normal operating mode. Such reduced power modes may include, e.g., efficiency modes, sleep modes, stand-by modes, hibernation modes, suspend modes, "green" modes, etc.

DETAILED DESCRIPTION

In accordance with some embodiments, a power management architecture may be compatible with various platform software (e.g., operating system, device drivers, firmware, etc.). In one or more embodiments, the power management architecture may include power logic located in each of multiple functional blocks ("block power logic") and a central power controller outside of the functional blocks.

In some embodiments, the central power controller may receive a first type of mode request (i.e., a request to initiate a reduced power mode in one or more functional blocks) from the operating system. Alternatively, the block power logic for a functional block may receive a second type of mode request from a device driver for the functional block. With either type of mode request, the central power controller may save the state of the functional block, thus enabling the functional block to be restored to its previous state upon exiting the reduced power mode. Accordingly, embodiments may enable various types of platform software to manage the power state of functional blocks.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below.

Moreover, the apparatus, methods, and systems described herein are not limited to physical computing devices, but may also relate to software optimizations for energy conservation and efficiency. As will become readily apparent in the description below, the embodiments of methods, apparatus, and systems described herein (whether in reference to hardware, firmware, software, or a combination thereof) are vital to a 'green technology' future, such as for power conservation and energy efficiency in products that encompass a large portion of the US economy.

Figure 1:
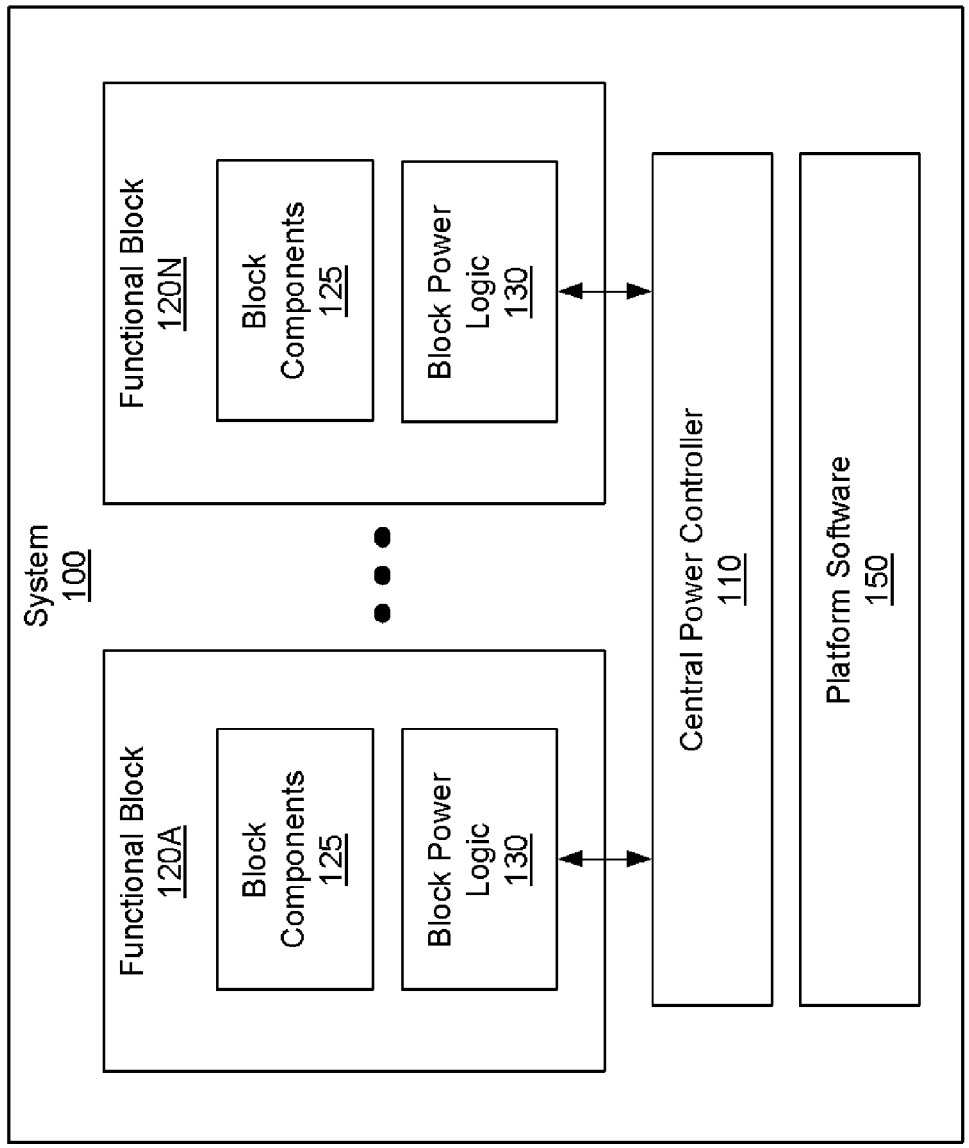
FIG. 1 is a block diagram in accordance with one or more embodiments.

Referring to FIG. 1, shown is a block diagram of a system 100 in accordance with one or more embodiments. In some embodiments, the system 100 may be all or a portion of an electronic device or component. For example, the system 100 may be a cellular telephone, a computer, a server, a network device, a processor, a system on a chip (SoC), a controller, a wireless transceiver, a power supply unit, etc. Furthermore, in some embodiments, the system 100 may be any grouping of related or interconnected devices, such as a datacenter, a computing cluster, a peer-to-peer (P2P) network, a local area network (LAN), a wide area network (WAN), a wireless ad hoc network, etc.

As shown in FIG. 1, the system 100 may include a central power controller 110, platform software 150, and/or any number of functional blocks 120A-120N. In embodiments in which the system 100 is all or a portion of a device, each functional block 120 includes one or more block components 125 configured to perform a specified function (or functions). For example, the functional blocks 120A-120N may represent intellectual property (IP) blocks included in a System on a Chip (SoC), hardware modules included in a computer, processing cores included in a processor, radio interface modules included in a wireless communication device, etc. Further, the block components 125 may include logic units, memory/storage components, interface units, power components, etc.

Further, in embodiments in which the system 100 is a grouping of devices, each functional block 120 may represent one of such devices. For example, in such embodiments, the functional blocks 120A-120N may represent computers included in a datacenter, nodes included in a computing cluster, blade servers included in an enclosure, drives included in a storage array, etc.

As shown, in one or more embodiments, each functional block 120 may include a block power logic 130. The block power logic 130 includes functionality to control or manage one or more reduced power modes of the functional block 120. In some embodiments, each reduced power mode of the functional block 120 corresponds to a particular combination of reduced levels of functionality and/or power consumption in comparison to an "awake" or normal operating mode. For example, in some embodiments, the block power logic 130 provides a "shallow" reduced power mode, meaning a reduced power mode which has a relatively low level of power savings, but which maintains a relatively high level of functionality, or which may require a relatively short time to restore full functionality. Further, the block power logic 130 may provide a "deep" reduced power mode, meaning a reduced power mode which has a relatively high level of power savings (e.g., little or no power is provided to the functional block). In some embodiments, the block power logic 130 also provides additional reduced power modes having levels of functionality and/or power savings between those of the shallow reduced power mode and the deep reduced power mode (e.g., a "medium" mode, a "medium-shallow" mode, a "medium-deep" mode, etc.).

In one or more embodiments, the block power logic 130 includes functionality to initiate a reduced power mode in the functional block 120 in response to a mode request. A first type of mode request may be a signal sent to the block power logic 130 by a device driver associated with the functional block 120. In response to receiving this mode request, the block power logic 130 may obtain state information for the functional block 120. For example, in the case that the functional block 120 is a processor core, such state information may include the state and/or contents of all elements in the core, including register values, accumulator values, cached data, flags settings, etc. In addition, the block power logic 130 may provide the state information to be stored by the central power controller 110. Further, the block power logic 130 may respond to the mode request by initiating the reduced power mode in the functional block 120.

In one or more embodiments, the central power controller 110 may include functionality to initiate and/or control one or more reduced power modes in the functional blocks 120. In particular, in some embodiments, the central power controller 110 may receive a second type of mode request from the operating system to initiate a reduced power mode in a given functional block 120. In response to this mode request, the central power controller 110 may obtain state information for the functional block 120, and may then initiate the reduced power mode in the functional block 120. For example, in some embodiments, the central power controller 110 may command the block power logic 130 to initiate the reduced power mode in the functional block 120. In another example, in some embodiments, the central power controller 110 may perform one or more power control actions to initiate the reduced power mode in the functional block 120. Such power control actions may include, e.g., gating power to the functional block 120, reduction of voltage supplied to the functional block 120, modification (e.g., reduction) of clock frequency for the functional block 120, etc.

In one or more embodiments, the block power logic 130 may also include functionality to initiate a reduced power mode independently (i.e., not in response to an external mode request). For example, in some embodiments, the block power logic 130 may detect a period of inactivity for the functional block 120 (e.g., no network and/or bus activity for the last ten microseconds, no user interaction during the last fifty microseconds, etc.). The block power logic 130 may then notify the central power controller 110 that the functional block 120 is idle, and is thus potentially suitable for entering a reduced power mode. In some embodiments, the central power controller 110 and the block power logic 130 may then interact to determine a specific time (if any) to initiate the reduced power mode in the functional block 120. This determination may be based on, e.g., historical data, use patterns, required levels of system availability and/or responsiveness, periodic timers, battery level, etc.

Figure 2A:
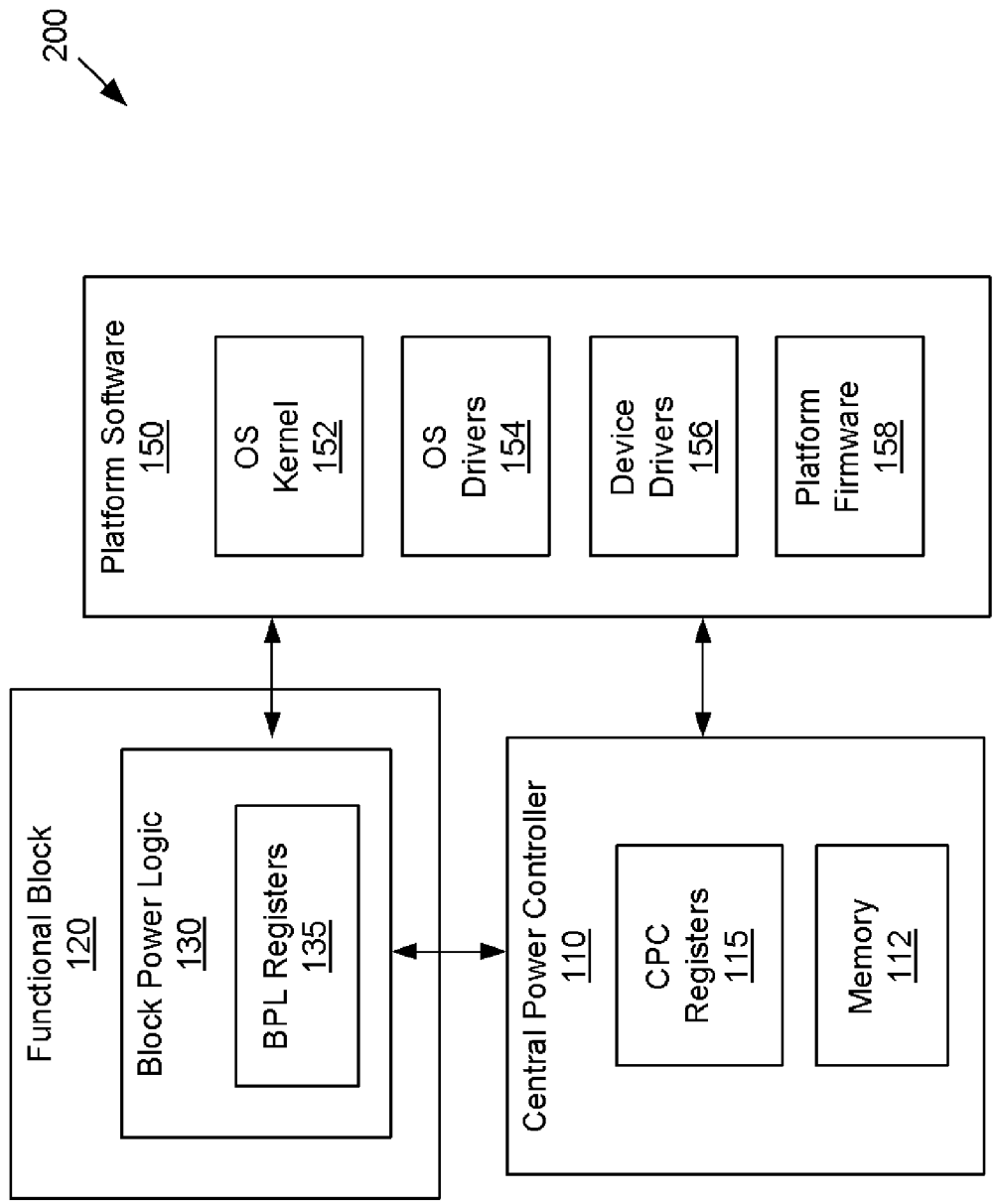
FIG. 2A-2B are block diagrams in accordance with one or more embodiments.

Referring now to FIG. 2A, shown is a diagram 200 in accordance with one or more embodiments. More specifically, the diagram 200 may generally correspond to an example embodiment of the system 100 shown in FIG. 1.

As shown, in some embodiments, the platform software 150 may include an operating system (OS) kernel 152, OS drivers 154, device drivers 156, and/or platform firmware 158. In some embodiments, the platform firmware 158 may implement the Advanced Configuration and Power Interface (ACPI) standard (e.g., Rev. 3.0b, published Oct. 10, 2006).

In one or more embodiments, the block power logic 130 of a functional block 120 may include one or more block power logic (BPL) registers 135. In one or more embodiments, the BPL registers 135 may be set in response to a mode request received from a device driver 156 associated with the functional block 120. For example, different BPL registers 135 may be set to indicate requests for various power modes and/or levels. The block power logic 130 may then initiate the corresponding power mode within the functional block 120 when the BPL registers 135 are set. Further, in some embodiments, the block power logic 130 also sends a notification signal to notify the central power controller 110 that the functional block 120 has entered a particular power mode.

In one or more embodiments, the central power controller 110 may include one or more central power controller (CPC) registers 115 and memory 112. In one or more embodiments, the CPC registers 115 may be set in response to a mode request received from the OS kernel 152. For example, different CPC registers 115 may be set to indicate requests for various power modes and/or levels. In some embodiments, a mode request may be transmitted from the OS kernel 152 to the CPC registers 115 via one or more of the OS drivers 154 (e.g., a bus driver). Further, in some embodiments, the CPC registers 115 may also be set in response to the notification signal received from the block power logic 130 (e.g., the notification signal sent by the block power logic 130 after the BPL registers 135 are set). The central power controller 110 may initiate a particular power mode in response to the corresponding CPC register(s) 115 being set.

In some embodiments, the memory 112 may include storage capacity to simultaneously store state information for all of the functional blocks 120A-120N included in the system 100. For example, as shown in FIG. 2A, the memory 112 may be Static Random-Access Memory (SRAM) included in the central power controller 110. Alternatively, in other embodiments, the memory 112 may be any type of storage device and/or may be included in any other component. For example, in some embodiments (not shown), the memory 112 may be SRAM included in the functional block 120 but external to the central power controller 110, may be Dynamic Random-Access Memory (DRAM) external to the functional block 120, etc.

In one or more embodiments, the central power controller 110 may include functionality to restore the state of a functional block 120 as part of returning the functional block 120 to a normal operating mode or power state. In some embodiments, the central power controller 110 may restore the state of the functional block 120 using the state information stored in the memory 112.

Note that the central power controller 110 and/or the block power logic 130 described herein may be independent of and/or complementary to power management aspects of the platform firmware 158, such as the ACPI standard.

According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic state in which, when power and/or thermal budget is available, processor hardware can configure the processor or at least portions thereof to operate at a higher than guaranteed frequency. In many implementations a processor can include multiple so-called bin frequencies above a guaranteed maximum frequency, also referred to as a P1 frequency. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Figure 2B:
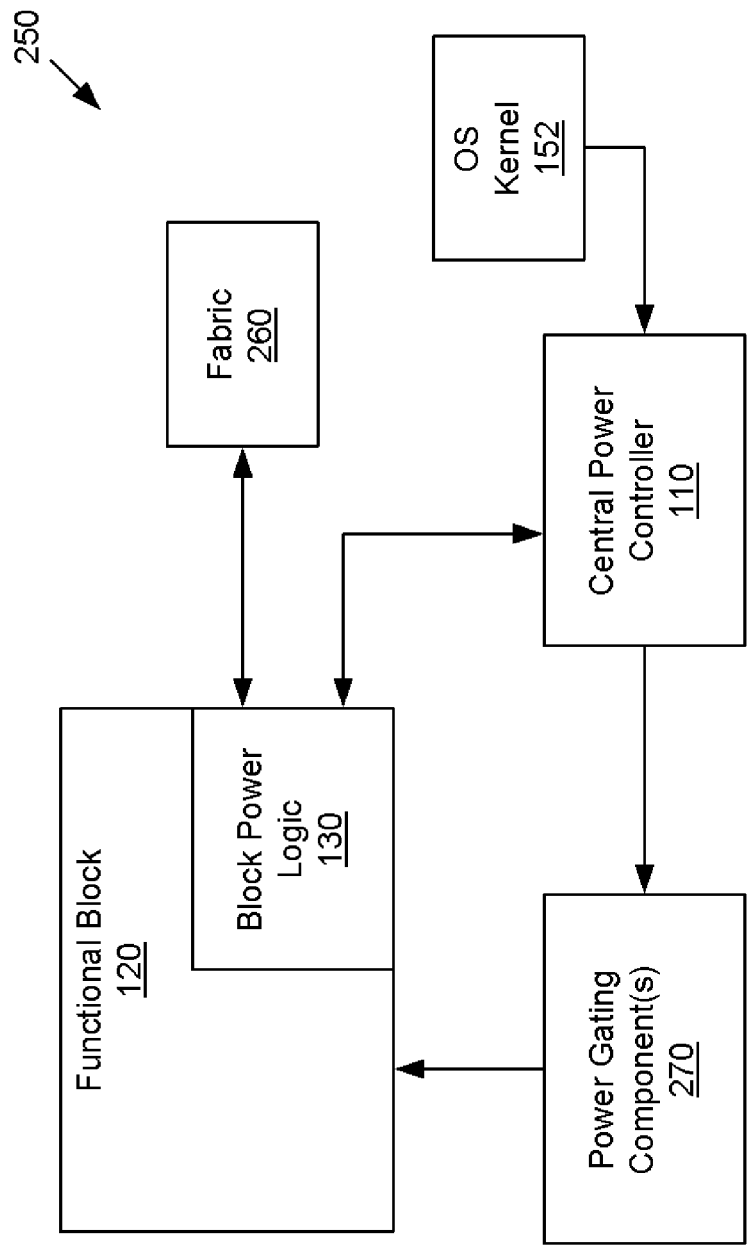

Referring now to FIG. 2B, shown is a diagram 250 in accordance with one or more embodiments. More specifically, the diagram 250 may generally correspond to another example embodiment of the system 100 shown in FIG. 1.

In one or more embodiments, the central power controller 110 may receive a mode request from the OS kernel 152. In response, the central power controller 110 may communicate with the block power logic 130 to initiate a reduced power mode. The block power logic 130 may then initiate the reduced power mode in the functional block 120. Further, the block power logic 130 may notify other components (not shown) using a fabric 260.

In some embodiments, the central power controller 110 may interact with one or more power gating components 270 to gate a power supply to the functional block 120. For example, in one embodiment, the power gating components 270 may include a field effect transistor (FET) to reduce or gate the voltage supplied to the functional block 120 (e.g., Vnn).

Figure 3:
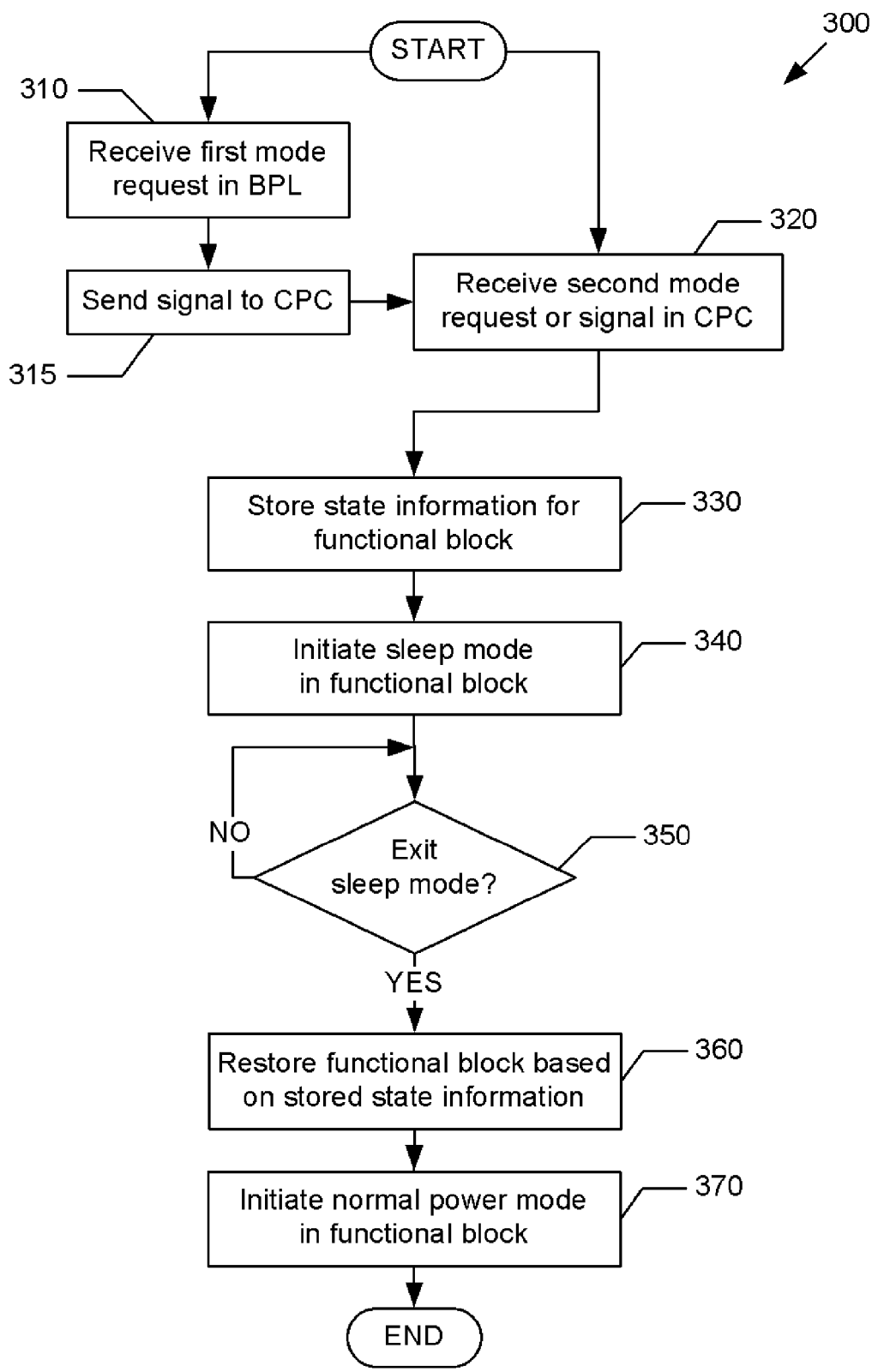
FIG. 3 is a sequence in accordance with one or more embodiments.

Referring now to FIG. 3, shown is a sequence 300 for managing reduced power modes, in accordance with one or more embodiments. In one or more embodiments, the sequence 300 may be part of the central power controller 110 and/or the block power logic 130 shown in FIG. 1. The sequence 300 may be implemented in hardware, software, and/or firmware. In firmware and software embodiments it may be implemented by computer executed instructions stored in a non-transitory computer readable medium, such as an optical, semiconductor, or magnetic storage device.

At step 310, a mode request to initiate a reduced power mode in a functional block may be received by block power logic included in the functional block. For example, referring to FIGS. 1 and 2A, the block power logic 130 included in a functional block 120 may receive a mode request from a device driver 156. In some embodiments, the device driver 156 is associated with the functional block 120 (or with one or more block components 125 included in the functional block 120). The mode request may be a signal generated based on one or more characteristics associated with the power consumption of the functional block 120 (e.g., idle time, load levels, thresholds, defined conditions, etc.). Further, in some embodiments, receiving the mode request may include setting the BPL registers 135.

At step 315, the block power logic may send a notification signal to notify the central power controller of the mode request received by the block power logic. For example, referring to FIGS. 1 and 2A, the block power logic 130 of the functional block 120 may send a notification signal to the central power controller 110.

At step 320, the notification signal sent by the block power logic (at step 315) may be received by a central power controller. Alternatively, at step 320, a mode request may be received by the central power controller. For example, referring to FIGS. 1 and 2A, the central power controller 110 may receive a notification signal from the block power logic 130. In one or more embodiments, receiving the notification signal may include setting the CPC registers 115. Alternatively, the central power controller 110 may receive a mode request from the OS kernel 152. In some embodiments, the mode request may be transmitted from the OS kernel 152 to the central power controller 110 using the OS drivers 154 (e.g., a bus driver). Further, in some embodiments, the OS kernel 152 may generate the mode request based on one or more characteristics associated with the power consumption of one or more functional blocks 120 and/or the system 100 as a whole. In one or more embodiments, receiving the mode request by the central power controller 110 may include setting the CPC registers 115.

At step 330, state information for the functional block may be stored. For example, referring to FIGS. 1 and 2A, the central power controller 110 may obtain state information for the functional block 120, and may store the state information in the memory 112. In some embodiments, the state information may be stored in SRAM included in the central power controller 110, in SRAM included in the functional block 120 but external to the central power controller 110, in DRAM external to the functional block 120, etc.

At step 340, the requested reduced power mode may be initiated in the functional block. For example, referring to FIGS. 1 and 2A, the block power logic 130 may initiate a reduced power mode in its functional block 120 in response to a mode request by the device driver associated with the functional block 120. In another example, in response to a mode request by the operating system, the central power controller 110 may perform one or more power control actions to initiate the reduced power mode in the functional block 120. In yet another example, the central power controller 110 may command the block power logic 130 to initiate the reduced power mode in the functional block 120.

At step 350, a determination about whether to exit the reduced power mode (initiated at step 340) is made. For example, referring to FIGS. 1 and 2A, the block power logic 130 and/or the central power controller 110 may evaluate operating conditions of the functional block 120 and/or the system 100 to determine whether to exit a reduced power mode.

If it is determined at step 350 to not exit the reduced power mode, the sequence 300 may return to step 350 to continue determining whether to exit the reduced power mode. However, if it is determined at step 350 to exit the reduced power mode, then at step 360, the functional block may be restored based on the state information (stored at step 330). For example, referring to FIGS. 1 and 2A, the central power controller 110 and/or the block power logic 130 may restore the functional block 120 to its state prior to entering the reduced power mode. The restoration of the functional block 120 may be based on the state information stored in the memory 112.

At step 370, a normal power mode may be initiated in the functional block. For example, referring to FIGS. 1 and 2A, the block power logic 130 may initiate a normal power mode in the functional block 120. In another example, the central power controller 110 may perform one or more power control actions to initiate the normal power mode in the functional block 120. After step 370, the sequence 300 ends.

Note that the examples shown in FIGS. 1, 2A, 2B, and 3 are provided for the sake of illustration, and are not intended to limit any embodiments. For instance, while embodiments may be shown in simplified form for the sake of clarity, embodiments may include any number and/or arrangement of processors, cores, and/or additional components (e.g., buses, storage media, connectors, power components, buffers, interfaces, etc.). In particular, it is contemplated that some embodiments may include any number of blocks, components, or controllers other than those shown, and that different arrangement of the components shown may occur in certain implementations. Further, it is contemplated that specifics in the examples shown in FIGS. 1, 2A, 2B, and 3 may be used anywhere in one or more embodiments.

Figure 4:
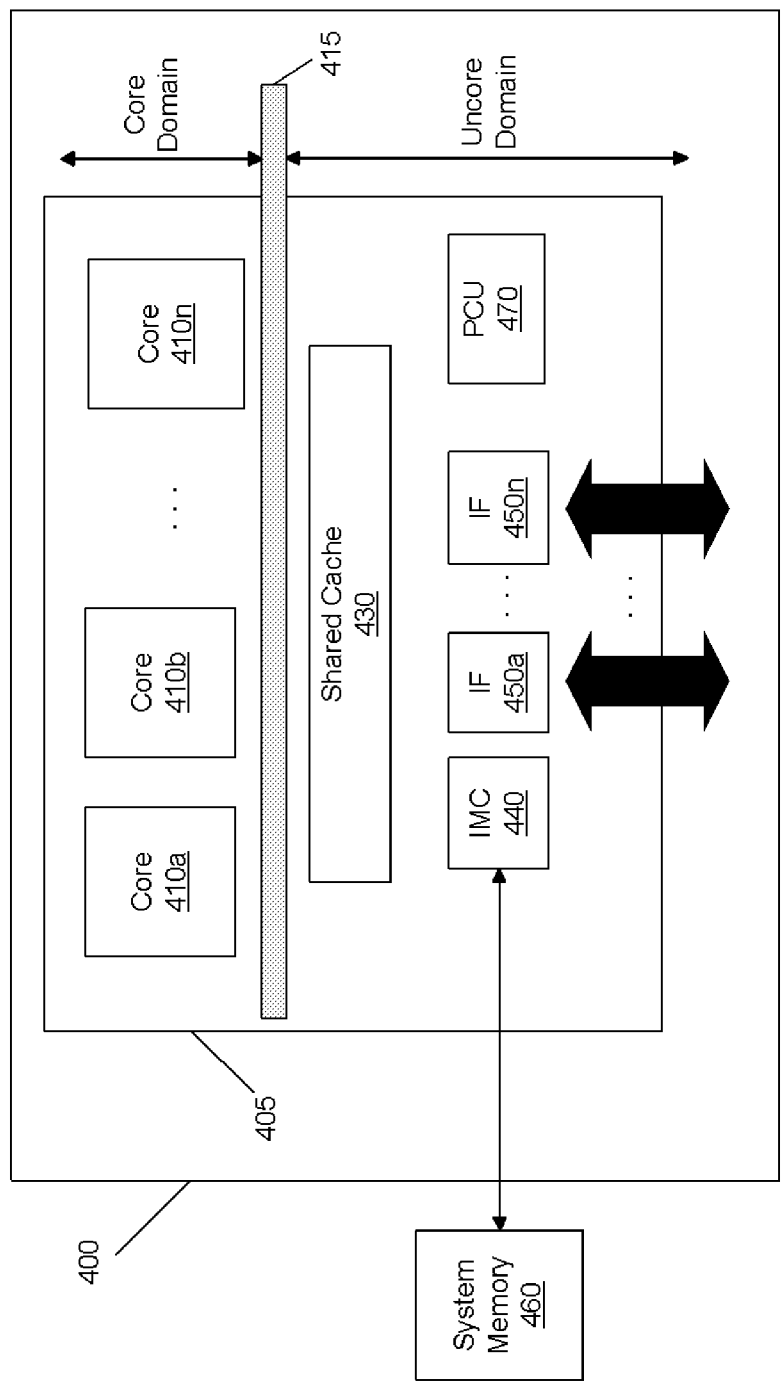
FIG. 4 is a block diagram of a processor in accordance with an embodiment of the present invention.

Referring now to FIG. 4, shown is a block diagram of a processor in accordance with an embodiment of the present invention. As shown in FIG. 4, the processor 400 may be a multicore processor including first die 405 having a plurality of cores 410a-410n of a core domain. The various cores 410a-410n may be coupled via an interconnect 415 to a system agent or uncore domain 420 that includes various components. As seen, the uncore domain 420 may include a shared cache 430 which may be a last level cache. In addition, the uncore may include an integrated memory controller 440, a power control unit (PCU) 470, and various interfaces 450.

Although not shown for ease of illustration in FIG. 4, in some embodiments, each of the cores 410a-410n may include the central power controller 110 and/or the block power logic 130 shown in FIG. 1. Alternatively, in some embodiments, the central power controller 110 may be included in the PCU 470, and each of the cores 410a-410n may include the block power logic 130.

With further reference to FIG. 4, the processor 400 may communicate with a system memory 460, e.g., via a memory bus. In addition, by interfaces 450, connection can be made to various off-package components such as peripheral devices, mass storage and so forth. While shown with this particular implementation in the embodiment of FIG. 4, the scope of the present invention is not limited in this regard.

Figure 5:
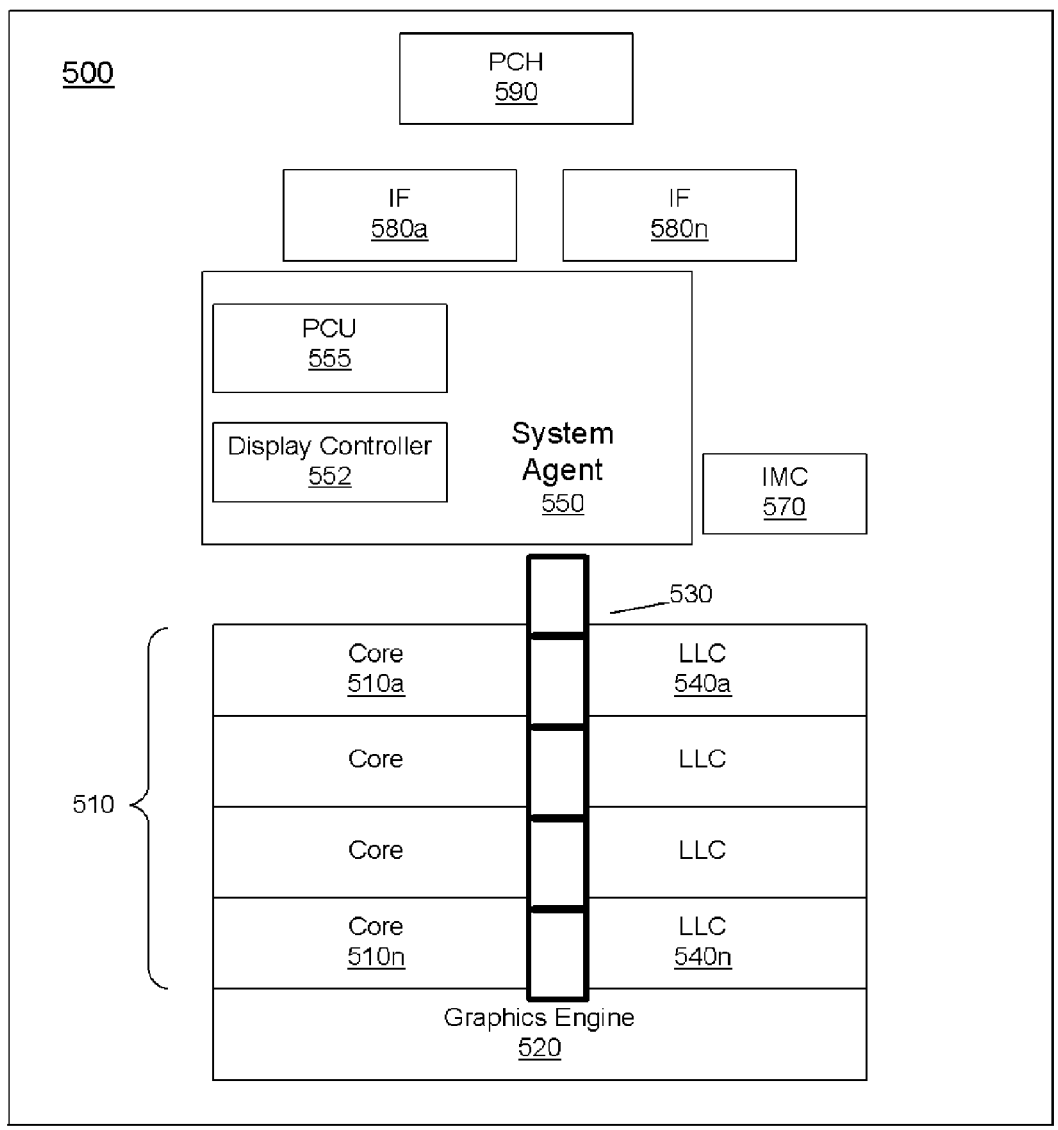
FIG. 5 is a block diagram of a multi-domain processor in accordance with another embodiment of the present invention.

Referring now to FIG. 5, shown is a block diagram of a multi-domain processor in accordance with another embodiment of the present invention. As shown in the embodiment of FIG. 5, processor 500 includes multiple domains. Specifically, a core domain 510 can include a plurality of cores 510a-510n, a graphics domain 520 can include one or more graphics engines, and a system agent domain 550 may further be present. Although not shown for ease of illustration in FIG. 5, in some embodiments, each of the cores 510a-510n can include the block power logic 130 described above with reference to FIG. 1. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) 540a-540n. In various embodiments, LLC 540 may be shared amongst the cores and the graphics engine, as well as various media processing circuitry. As seen, a ring interconnect 530 thus couples the cores together, and provides interconnection between the cores, graphics domain 520 and system agent circuitry 550. In the embodiment of FIG. 5, system agent domain 550 may include display controller 552 which may provide control of and an interface to an associated display. As further seen, system agent domain 550 may also include a power control unit 555 to allocate power to the CPU and non-CPU domains. In some embodiments, the power control unit 555 may include some or all of the functionality of the central power controller 110 and/or the block power logic 130 described above with reference to FIG. 1.

As further seen in FIG. 5, processor 500 can further include an integrated memory controller (IMC) 570 that can provide for an interface to a system memory, such as a dynamic random access memory (DRAM). Multiple interfaces 580a-580n may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. As further seen, a peripheral controller hub (PCH) 590 may also be present within the processor 500, and can be implemented on a separate die, in some embodiments. Alternatively, in some embodiments, the PCH 590 may be external to the processor 500. Although shown at this high level in the embodiment of FIG. 5, understand the scope of the present invention is not limited in this regard.

Figure 6:
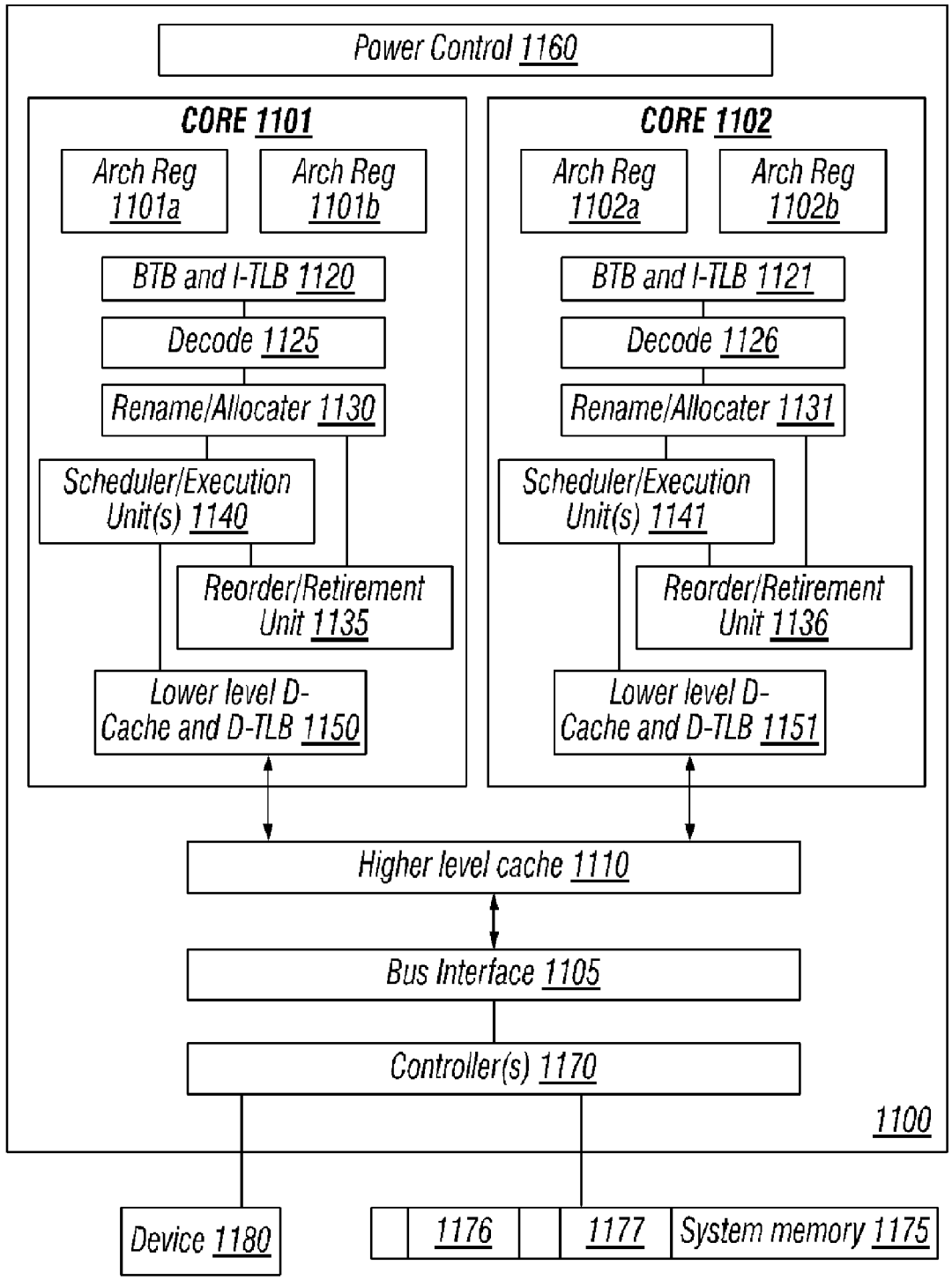
FIG. 6 is a block diagram of an embodiment of a processor including multiple cores.

Referring to FIG. 6, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric. Although not shown for ease of illustration in FIG. 6, in some embodiments, each of the cores 1101 and 1102 can include the central power controller 110 and/or the block power logic 130 described above with reference to FIG. 1.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 6, includes two cores, cores 1101 and 1102. Here, cores 1101 and 1102 are considered symmetric cores, i.e. cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As shown, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above.

As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 6, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. As a result of the recognition by decoders 1125, the architecture or core 1101 takes specific, predefined actions to perform tasks associated with the appropriate instruction (e.g., one or more of the actions shown in FIG. 3). It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101a and 1101b are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. In some embodiments, the power controller 1160 may include some or all of the functionality of the central power controller 110 and/or the block power logic 130 described above with reference to FIG. 1.

Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller (s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 7:
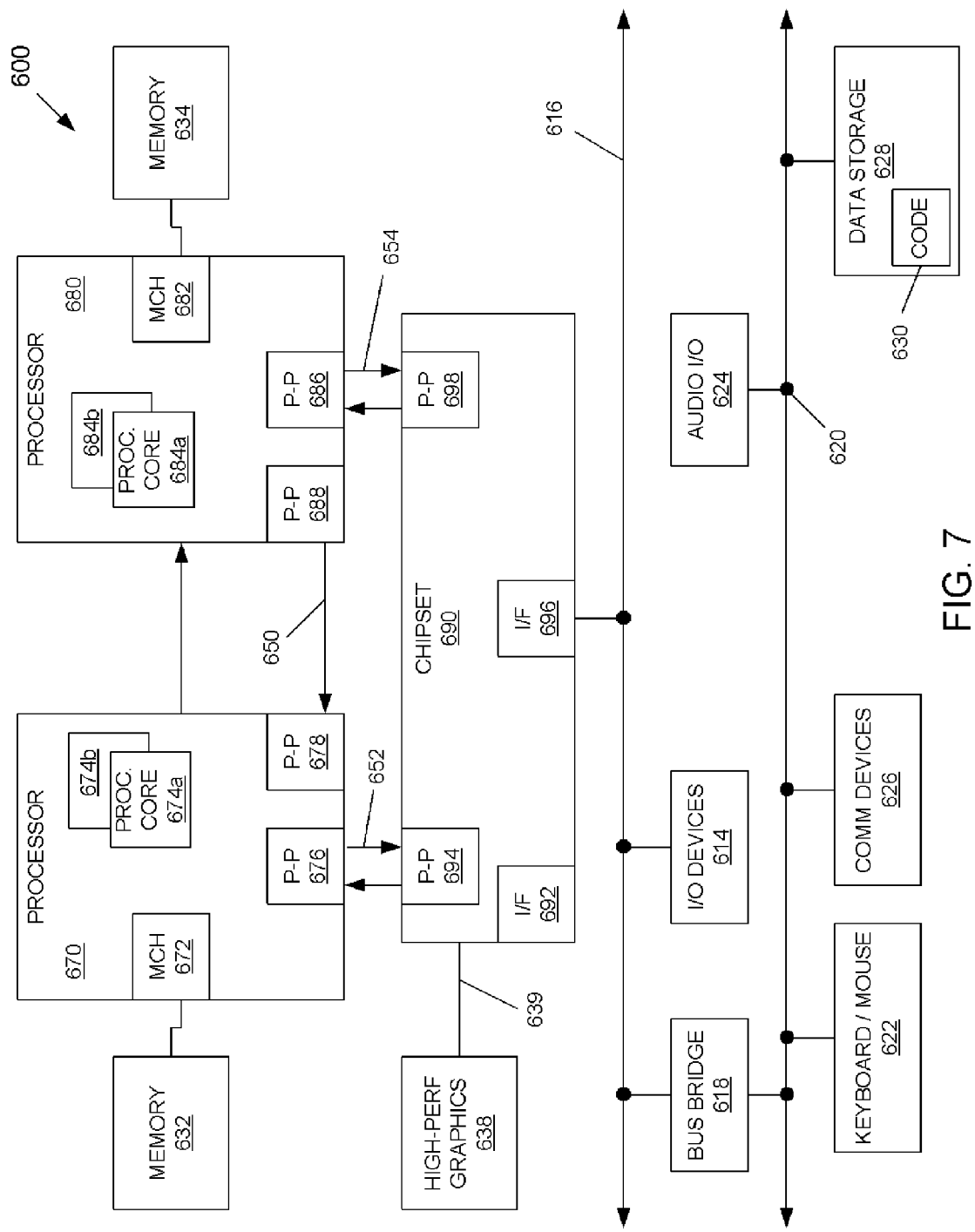
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 600 is a point-to-point interconnect system, and includes a first processor 670 and a second processor 680 coupled via a point-to-point interconnect 650. As shown in FIG. 7, each of processors 670 and 680 may be multicore processors, including first and second processor cores (i.e., processor cores 674a and 674b and processor cores 684a and 684b), although potentially many more cores may be present in the processors. Each of these processors can include any part of the central power controller 110 and/or the block power logic 130 described above with reference to FIG. 1.

Still referring to FIG. 7, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 7, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 7, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 7, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

It should be understood that a processor core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Any processor described herein may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor may be a part of and/or may be implemented on one or more substrates using any of a number of process technologies, such as, for example, BiCMOS, CMOS, or NMOS.

It is contemplated that the processors described herein are not limited to any system or device. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Generally, some embodiments disclosed herein may enable low power consumption in a SoC in an OS and device driver agnostic way and with minimal changes to hardware functional blocks (e.g., an IP block) connected to the SoC. Some embodiments may implement a power management (PM) architecture and microarchitecture in the SoC that provides an infrastructure to let IP blocks to reach their lowest power state possible including POWER OFF state without incurring significant latencies during the exit lead-in, and providing a seamless user experience. This infrastructure may work within the constraints of the PM architecture of existing operating systems, thereby providing benefits for the various operating systems.

Some embodiments may include a central power controller (CPC) that communicates with each IP block in the SoC, a standard PM interface protocol between the CPC and the IP blocks to power gate each IP block, a set of control register interfaces in the CPC that allows any OS to talk to devices, and a CPC-initiated method to save and restore the state each IP to allow it to be power-gated without losing context for seamless exit from power down state. The IP blocks can include device controllers as well as fabric segments or fabric bridges.

In some embodiments, power gating may be initiated using one or more techniques, including: 1) Hardware idle—an IP block decides that it can be power gated as it detects a period of idleness and it can tolerate the wake time; 2) OS request (e.g., Windows RTD3 request)—the PCI bus driver informs the CPC that a certain IP block is idle and can be power gated; 3) Device driver initiated (e.g., Android D0ix request)—the device driver will detect/estimate idleness and that it can tolerate the wake time, and will write a control bit in the device which will initiate the power gating. The CPC will coordinate the state save at the time of power gating and the state restore at the time of power un-gating. Some embodiments may use hardware to save and restore context which is much faster and can be done power efficiently. It also provides mechanisms where the devices can communicate latency requirements so that IP blocks can be efficiently power gated. Some embodiments may also provide a standard hardware block (e.g., block power logic 130 shown in FIG. 1) which allows each IP block to be power gated in a standard way. Further, some embodiments may support device driver and OS requests (e.g., RTD3 and D0ix, respectively) for different IP blocks. Some embodiments may include a standard CPC and a standard protocol to power gate, a hardware based method to save and restore state of each IP block, and a device driver interface to allow lower exit latencies and lower power states in IP blocks.

The following clauses and/or examples pertain to further embodiments. In one example, a processor may include at least one functional block and a central power controller. The at least one functional block may include at least one block component and block power logic. The block power logic may be to: receive a first request to initiate a first reduced power mode in the at least one functional block, and in response to the first request, send a notification signal to a central power controller. The central power controller may be to, in response to the notification signal: store a first state of the at least one functional block, and initiate the first reduced power mode in the at least one functional block.

In an example, the central power controller may be further to: receive a second request to initiate a second reduced power mode in the at least one functional block, and in response to the second request, store a second state of the at least one functional block.

In an example, the central power controller may be further to, in response to the second request, perform at least one power control action to initiate the second reduced power mode in the at least one functional block.

In an example, the central power controller may be further to receive the second request using at least one register bit included in the central power controller. In an example, the central power controller may be further to receive the notification signal using the at least one register bit included in the central power controller.

In an example, the second request may be requested by an operating system kernel.

In an example, the second request may be sent using a bus driver.

In an example, the block power logic may be to receive the first request using one or more register bits included in the block power logic.

In an example, the first request may be sent by a device driver.

In an example, the central power controller may be to store the first state of the at least one functional block in a memory of the central power controller. In an example, the processor may include a plurality of functional blocks, where the memory comprises capacity to store state information for all of the plurality of functional blocks.

In an example, the central power controller may be to perform one or more power control actions to initiate the first reduced power mode, where the one or more power control actions comprise power gating, voltage reduction, and clock rate reduction.

In an example, the processor a processor for executing instructions.

In another example, a system may include a plurality of functional blocks and a central power controller. Each of the plurality of functional blocks may include one or more hardware block components and block power logic. The block power logic may be to: receive a first request for a first reduced power mode, and send a notification signal to a central power controller. The central power controller may be to, in response to receiving the notification signal from one of the plurality of functional blocks: store a first state of the one of the plurality of functional blocks, and initiate the first reduced power mode in the one of the plurality of functional blocks.

In an example, the system may be a System On a Chip (SOC).

In an example, the central power controller may be further to: receive a second request for a second reduced power mode in the one of the plurality of functional blocks, and in response to the second request: store a second state of the one of the plurality of functional blocks, and perform at least one power control action to initiate the second reduced power mode in the one of the plurality of functional blocks.

In an example, the central power controller may be to receive the second request using at least one register bit included in the central power controller.

In an example, the block power logic may be to receive the first request using one or more register bits included in the block power logic.

In an example, the block power logic may be to perform at least one power control action to initiate the first reduced power mode in the one of the plurality of functional blocks.

In another example embodiment may be a method, including: receiving, by block power logic included in a first functional block of a processor, a first request for a first reduced power mode in the first functional block; in response to the first request, sending, by the block power logic, a notification signal to a central power controller of the processor; causing storing, by the central power controller, of a first state of the first functional block in a first storage, and initiating the first reduced power mode in the first functional block.

In an example, the method may also include receiving, by the central power controller, a second request for a second reduced power mode in a second functional block of the processor, and in response to the second request: causing storing, by the central power controller, of a second state of the second functional block in the first storage, and initiating the second reduced power mode in the second functional block. In an example, receiving the second request comprises using at least one register bit included in the central power controller.

In an example, the method may also include restoring the first functional block based on the stored first state; and initiating a normal power mode in the first functional block.

In an example, initiating the first reduced power mode may include performing, by the central power controller, one or more power control actions. In an example, performing the one or more power control actions may include at least one of gating power to the first functional block, reducing voltage supplied to the first functional block, and reducing clock frequency for the first functional block.

In an example, receiving the first request comprises using one or more register bits included in the block power logic.

In an example, the method may also include sending the first request by a device driver.

In an example, the method is a method for managing power consumption of a processor.

In another example, a communication device may be arranged to perform the method of any of the above examples.

In another example, at least one machine readable medium may include a plurality of instructions that in response to being executed on a computing device, cause the computing device to carry out the method of any of the above examples.

In another example, an apparatus for processing instructions is configured to perform the method of any of the above examples.

In another example, an apparatus comprises means for performing the method of any of the above examples.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments for the sake of illustration, those skilled in the art will appreciate numerous modifications and variations therefrom. It is intended that the appended claims cover all such modifications and variations as fall within the true spirit and scope of this present invention.

What is claimed is:

1. A processor comprising:
    a functional block; and
    a central power controller,
    wherein the functional block of the processor includes:
        at least one block component; and
        block power logic to:
            receive a first request from a device driver of the functional block to initiate a first reduced power mode only in the functional block, and
            in response to a receipt of the first request, send, to the central power controller of the processor, a notification signal indicating the receipt of the first request from the device driver;
    wherein the central power controller of the processor can receive the notification signal from the block power logic of the functional block included in the processor, wherein the central power controller of the processor can also separately receive from an operating system kernel a second request to initiate a second reduced power mode only in the functional block included in the processor, wherein the central power controller of the processor is to:
        in response to the notification signal from the block power logic, store a state of the functional block included in the processor, and
        in response to the second request from the operating system kernel, store the state of the functional block included in the processor.

2. The processor of claim 1, wherein the central power controller is further to:
    in response to the second request, send a command to the block power logic to initiate the second reduced power mode in the functional block.

3. The processor of claim 1, wherein the central power controller is further to, in response to the second request, perform at least one power control action to initiate the second reduced power mode in the functional block.

4. The processor of claim 1, wherein the central power controller is to receive the second request using at least one register bit included in the central power controller.

5. The processor of claim 1, wherein the central power controller is further to receive the notification signal from the block power logic using the at least one register bit included in the central power controller.

6. The processor of claim 1, wherein the block power logic is to, in response to the first request from the device driver, initiate the first reduced power mode in the functional block.

7. The processor of claim 1, wherein the block power logic is further to initiate a third reduced power mode in the functional block without receiving any external mode request, and send the notification signal to the central power controller.

8. The processor of claim 1, wherein the block power logic is to receive the first request from the device driver of the functional block using one or more register bits included in the block power logic.

9. The processor of claim 1, wherein the device driver of the functional block is associated with the at least one functional block.

10. The processor of claim 1, wherein the central power controller is to store the state of the functional block in a memory of the central power controller.

11. The processor of claim 10, wherein the processor comprises a plurality of functional blocks, and wherein the memory comprises capacity to store state information for all of the plurality of functional blocks.

12. The processor of claim 1, wherein the central power controller is to perform one or more power control actions to initiate the first reduced power mode, wherein the one or more power control actions comprise power gating, voltage reduction, and clock rate reduction.

13. A system comprising:
  a processor including a plurality of functional blocks and a central power controller; and
  a platform memory coupled to the processor,
  wherein a first functional block of the processor includes:
    one or more hardware block components; and
    block power logic to:
      receive, from a device driver of the first functional block, a first request to initiate a first reduced power mode only in the first functional block, and
      in response to a receipt of the first request, send, to central power controller of the processor, a notification signal indicating the receipt of the first request from the device driver;
  wherein the central power controller of the processor can receive the notification signal from the block power logic of the first functional block included in the processor,
  wherein the central power controller of the processor can also separately receive from an operating system kernel a second request to initiate a second reduced power mode only in the first functional block included in the processor,
  wherein the central power controller of the processor is to:
    in response to receiving the notification signal from the block power logic of the first functional block, store a first state of the first functional block, and
    in response to the second request from the operating system kernel, store the state of the first functional block.

14. The system of claim 13, wherein the central power controller is further to:
  in response to the second request from the operating system kernel:
    perform at least one power control action to initiate the second reduced power mode in the first functional block.

15. The system of claim 13, wherein the central power controller is to receive the second request from the operating system kernel using at least one register bit included in the central power controller.

16. The system of claim 13, wherein the block power logic is to receive the first request from the device driver using one or more register bits included in the block power logic.

17. The system of claim 13, wherein the block power logic of the first functional block is to perform at least one power control action to initiate the first reduced power mode in the first functional block.

18. A method, comprising:
  receiving from a device driver, by block power logic included in a first functional block of a processor, a first request to initiate a first reduced power mode only in the first functional block of the processor;
  in response to a receipt of the first request, sending to a central power controller of the processor, by the block power logic of the first functional block, a notification signal indicating the receipt of the first request from the device driver, wherein the central power controller of the processor can receive the notification signal from the block power logic of the first functional block, wherein the central power controller of the processor can also separately receive from an operating system kernel a second request to initiate a second reduced power mode only in the first functional block of the processor;
  storing, by the central power controller of the processor, a state of the first functional block in a first storage, wherein the storing can be in response to the notification signal from the block power logic of the first functional block or to the second request from the operating system kernel.

19. The method of claim 18, wherein receiving the first request from the device driver by the block power logic comprises using one or more register bits included in the block power logic.

20. The method of claim 18, further comprising:
  in response to the second request received from the operating system kernel, sending, by the central power controller of the processor, a command to the block power logic of the first functional block to initiate the second reduced power mode in the first functional block of the processor.

21. The method of claim 18, further comprising:
  restoring the first functional block of the processor based on the stored state; and
  initiating a normal power mode in the first functional block of the processor.

22. The method of claim 18, further comprising:
  in response to the second request received from the operating system kernel, performing, by the central power controller of the processor, one or more power control actions to initiate the second reduced power mode in the first functional block of the processor.

23. The method of claim 22, wherein performing the one or more power control actions comprises at least one of gating power to the first functional block, reducing voltage supplied to the first functional block, and reducing clock frequency for the first functional block.

* * * * *